(12) United States Patent
Soares De Aquino et al.

(10) Patent No.: US 12,485,137 B2
(45) Date of Patent: Dec. 2, 2025

(54) SAFE BOVINE HEPARIN, PREPARATION METHOD, AND APPLICATION

(71) Applicant: HEPTECH PESQUISA E DESENVOLVIMENTO LTDA, Rio de Janeiro (BR)

(72) Inventors: Rafael Soares De Aquino, Rio de Janeiro (BR); Paulo Antonio De Souza Mourão, Rio de Janeiro (BR); Luciano Neves De Medeiros, Rio de Janeiro (BR); Eduardo Prata Vilanova, Rio de Janeiro (BR); Ana Maria Freire Tovar, Rio de Janeiro (BR); Stephan Nicollas Marcin Centena Goulart De Oliveira, Rio de Janeiro (BR)

(73) Assignee: HEPTECH PESQUISA E DESENVOLVIMENTO LTDA, Rio de Janeiro (BR)

( * ) Notice: Subject to any disclaimer, the term of this patent is extended or adjusted under 35 U.S.C. 154(b) by 837 days.

(21) Appl. No.: 17/430,043

(22) PCT Filed: Feb. 11, 2019

(86) PCT No.: PCT/BR2019/050039
§ 371 (c)(1),
(2) Date: Aug. 11, 2021

(87) PCT Pub. No.: WO2020/163926
PCT Pub. Date: Aug. 20, 2020

(65) Prior Publication Data
US 2022/0096530 A1  Mar. 31, 2022

(51) Int. Cl.
*A61K 38/00* (2006.01)
*A61K 31/727* (2006.01)
*A61P 7/02* (2006.01)

(52) U.S. Cl.
CPC .............. *A61K 31/727* (2013.01); *A61P 7/02* (2018.01)

(58) Field of Classification Search
None
See application file for complete search history.

(56) References Cited

FOREIGN PATENT DOCUMENTS

WO    WO-2017032276 A1 *  3/2017  ........... A61K 31/727

OTHER PUBLICATIONS

Meer et al. (Molecules 2017, 22, 1025). From Farm to Pharma: An Overview of Industrial Heparin Manufacturing Methods. (Year: 2017).*

Translation of WO2017032276A1 provided by Espacenent (Year: 2017).*

Liang et al. (Acta Biomater. Aug. 2, 2013;10(4):1588-1600). Heparin-functionalized polymeric biomaterials in tissue engineering and drug delivery applications (Year: 2013).*

International Search Report and Written Opinion for Appln No. PCT/BR2019/050039, Jun. 12, 2019.

Anvisa. Agencia Nacional De Vigilancia Sanitaria. Farmacopeia Brasileira, Segundo Suplemento. 5a Ed. Brasilia, 2017. Pag: 963-974.

Anmat, Administracion Nacional de Medicamentos, Alimentos y Tecnologia Medica. Farmacopea Argentina, vol. III. Septima edicion, Buenos Aires, 2013. Pag: 564-566.

Gómez Ochoa. Obtencion, caracterizacion y evaluacion de nitroderivados de heparina y heparinas de bajo peso molecular para el tratamiento de ulceras. 2017. 269 pages. PhD Thesis-Instituto de Psicologia, Universidad Complutense de Madrid, Madrid. 2017.

Jan-Ytzen Van Der Meer et al. From Farm to Pharma: An Overview of Industrial Heparin Manufacturing Methods. Molecules, V. 22, n.6, Jun. 21, 2017, p. 1-13.

Keire, D et al. Diversifying the Global Heparin Supply Chain: Reintroduction of Bovine Heparin in the United States? The global supply chain for bovine and porcine heparin and regulatory considerations are examined. Pharmaceutical Technology, V. 39, n. 11, Nov. 2, 2015, p. 28-35.

Kariya Y et al. Preparation of completely 6-o-Desulfated heparin and its ability to enhance activity of basic fibroblast growth factor. The Journal of Biological Chemistry, V. 275, n.34, Aug. 25, 2000, p. 28-35.

Melo, E I et al. Heparin quality control in the Brazilian market: implications in the cardiovascular surgery. Rev Bras Cir Cardiovasc, V. 23, n. 2, 2008, p. 169-174.

* cited by examiner

*Primary Examiner* — Li N Komatsu
*Assistant Examiner* — Mercy H Sabila
(74) *Attorney, Agent, or Firm* — Allen, Dyer, Doppelt & Gilchrist, P.A.

(57) ABSTRACT

The present invention relates to preparation method for the scale up production of a safe bovine heparin composed by a distinctively selected unfractioned bovine heparin polymers with low 6-O-desulfated glucosamine content and a porcine-like anticoagulant activity and protamine neutralization, and methods of its production and application. This safe bovine heparin (SB Heparin) has a comparable structure and function to the porcine heparin, the clinical usage reference, preventing clinical usage impairments as a safe pharmaceutical product, allowing its use as interchangeably drugs.

6 Claims, 9 Drawing Sheets

FIG.1A

| Origin | | Porcine | | | | | | Bovine | | |
|---|---|---|---|---|---|---|---|---|---|---|
| Supplier | | I | II | III | IV | V | Average | I | II | Average |
| Number of batches | | 8 | 2 | 7 | 4 | 2 | 23 | 8 | 6 | 14 |
| A1* | | 95.1±0.8 | 94.5±0.7 | 93.4±0.8 | 94.8±0.5 | 96.0±0.0 | 94.6±1.1 | 48.3±1.2 | 53±1.4 | 49.5±1.9 |
| B1* | | <2 | <2 | <2 | <2 | <2 | <2 | 15.2±2.1 | 12.7±1.6 | 14.0±2.2 |
| C1 | | 4.9±0.8 | 5.5±0.7 | 6.6±0.8 | 5.3±0.5 | 4.0±0.0 | 5.4±1.1 | 36.5±1.8 | 36.5±1.8 | 36.5±1.3 |
| II-B+C | | 5.0±0.9 | 6.5±0.7 | 4.7±0.8 | 4.0±0.8 | 3.5±0.7 | 4.7±1.1 | 48.7±1.9 | 48.7±1.9 | 48.6±1.7 |
| II-A | | 92.5±1.1 | 91.5±0.7 | 93.4±1.1 | 94.0±0.8 | 95.0±1.4 | 93.2±1.4 | 48.2±1.9 | 48.8±4.5 | 48.4±1.8 |
| II-deS | | 2.5±0.5 | 2.0±0.0 | 1.9±0.7 | 2.0±0.8 | 1.5±0.7 | 2.1±0.7 | 3.1±0.4 | 2.8±1.0 | 3.0±0.6 |
| II-C | | 3.6±0.5 | 3.0±0.0 | 4.6±0.5 | 3.5±0.6 | 3.0±0.0 | 3.8±0.7 | 36.4±1.8 | 35.3±1.9 | 35.3±2.1 |
| II-A+B | | 96.4±0.5 | 97.0±0.0 | 95.4±0.6 | 96.5±0.6 | 97.0±0.0 | 96.2±0.7 | 63.6±1.8 | 64.7±1.9 | 64.1±1.9 |

Values corresponding to the integrals of the $^1H$ signals as a percentage of the total area (mean ± SD) obtained from a nuclear magnetic resonance spectrum for $^1H$ of bovine and porcine heparin.

SAFE BOVINE HEPARIN, PREPARATION METHOD, AND APPLICATION

TECHNICAL FIELD

The present invention relates to the preparation of a new and safe bovine heparin, which is a safe anticoagulant medication from bovine intestinal mucosa, the field of biotechnology medicine of drug discovery and manufacturing.

SUMMARY

A safe bovine heparin, a unfractionated heparin from bovine intestinal mucosa with low 6-O-desulfated glucosamine content and a porcine-like anticoagulant activity and protamine neutralization, and its preparation method and application.

BACKGROUND

Glycosaminoglycans (GAGs) are linear complex heteropolysaccharides found as components of the extracellular matrix (EMC), cell surface and intracellular space. The history of GAGs dates from the 19th century, when chondroitin sulfate (CS) was first identified as a component of the cartilage and its structure was further elucidated (DAVIDSON and MEYER, 1954). CS is polymer composed of disaccharide repetitive units of glucuronic acid and N-acetylgalactosamine, which may be sulfated in the positions 4 or 6 of the N-acetylgalactosamine [→4-βGlcA-(1→3)-β-GalNAc-(4S)(6S)-1→]. Subsequent studies revealed that CS is wide spread in nature, similarly to other GAGs further described.

Curiously, in the beginning or the 20th century a research for pro-coagulant phospholipids at different tissue extracts let to the discovery of an anti-coagulant GAG. The dog liver alcohol extraction rendered a "fat soluble" fraction with un-expected anti-coagulant effect. The anti-coagulant effect was associated with the presence of a carbohydrate compound that was named heparin, (hepar is the Greek word for liver) (Howell and Holt, 1918) (Howell, 1925). Later, the use of NMR analysis techniques revealed that heparin is composed by repetitive disaccharide units of a iduronic acid and a N-acetyl glucosamine mainly sulfated at N-, 6-O-, 2-O-position [→4-β-IdoA-(2S)-1-(1-(1→4)-α-GlcNAc-(NS)(6S)-1→] (Cifonelli and Dorfman, 1962).

Despite limited information about the structure and biological function, the need for an anticoagulant drug pushed a crystal form of heparin to be tested in clinical trial and eraser the pharmaceutical market (Wardrop and Keeling, 2008), demonstrating its clinical relevance and need as an anticoagulant drug.

The later advance on chromatography and NMR analytical techniques let to the elucidation of the required motifs for specific GAG-protein binding interactions. HPLC and NMR analysis of heparin bound to growth factors revealed that 2-O sulfated of the iduronic acid (Habuchi et al., 1992) is essential for specific growth factor interactions, bFGF binding not for FGF-2, which instead required. 6-O sulfated N-acetyl glucosamine (Maccarana et al., 1993). On the other hand, the polysaccharide binding site that mediates the heparin-antithrombin III binding and inhibition requires the rare 3-O-sulfation at the N-acetyl glucosamine (Lindahl et al., 1980), in addition to other structural modifications. These early examples showed the markedly significance of heparin structure that regulates its interaction and dictates its biological functions.

Despite the fact that dog liver was the initial source of heparin, with a more practical view, an analysis focused on the production revealed that heparin preparations extracted the different tissues showed high concentrations of this GAG in bovine intestines and lungs, selected as early sources of heparin for clinical use. Bovine unfractionated heparin (UFH) was initially market on the United States health system market on 1939 and was sold for more than 50 years after that.

During the early/mid 80's the UFH heparin from bovine source was spontaneously withdrawn from major markets due to the risk of bovine spongiform encephalopathy (BSE) contamination, rendering for porcine mucosa an almost exclusive supply of the global heparin market.

However, the high worldwide use of this life saving drug puts heparin production on shortage risk by limiting its source to a porcine origin. Besides, there is a higher risk of shortage by raw material supply variations by having heparin produce mainly by one animal source, pig and, and on geographic region, china.

The risk of BSE contamination is better understood as the knowledge BSE analytical and purification techniques evolved. Recent studies have shown that the different steps of heparin purification are able to drastically remove the bovine spongiform encephalopathy agent from crude heparin (Bett et al., 2017), demonstrating this is a controlled risk at the present time. A similar evolution was shown on BSE agent detection, facilitating the quality control of purified heparin from a bovine source.

The combination of recent market needs with the scientific evolution on the field led to the common knowledge that bovine heparin must be re-introduced in the market. Regulatory agencies openly declared the need for bovine heparin marketing re-introduction (Szajek et al., 2016).

However, despite lowering the risk of BSE, bovine heparin preparations still show lower quality and activity, which is a persisting problem for its re-introduction. Heparin extracted and purified from bovine mucosa has structural differences when compared to the porcine one (drug of reference). In comparison to porcine heparin, the bovine mucosa heparin shows lower rates of 6-O-sulfation and higher rates of N-acetylation of the glucosamine residue (Aquino et al., 2010). Associated with these structural differences is observed lower anticoagulant activity in vitro with whole plasma or purified clotting factors Xa and IIa, ex vivo with mice plasma post treatment and in vivo in an animal model of venous thrombosis. These results have been confirmed by other research studies (Santos et al., 2014, Tovar et al., 2016). A lower anticoagulant activity of bovine heparin has also been demonstrated in the plasma of patients under dialysis when compared to patients treated with porcine one (Tovar et al., 2013).

Despite having a lower anticoagulant activity, bovine heparin samples have higher hemorrhagic tendencies, as shown by the higher rates of blood loss in an animal model. Additionally, it was observed that it was required higher concentrations of protamine, the heparin antidote, to neutralize bovine heparin anticoagulant activity (Aquino et al., 2010). The combination of both observations suggests the mechanistic determinant for the increased of clinically detected hemorrhagic events observed in the Brazilian Health System after the substitution of a porcine heparin with a bovine one (Melo et al., 2008, Junqueira et al., 2011).

Therefore, this structure and function differences compared to porcine heparin renders a critical risk for its clinical use.

In summary, despite the health system needs and the advance on BSE prevention, the re-introduction of bovine heparin in the market is restricted by its lower anticoagulant activity and higher hemorrhagic characteristics. Thus, is essential to determine the structural/function of the polydisperse heterogeneous population of unfractionated bovine heparin targeting the scalable production of a new poll of high quality bovine heparin with a clinical activity similar to the reference product in the market (porcine heparin), avoiding variations during clinical administration, which have been shown to have deleterious effect on patient survival. Further, a patent search on both SPACENET and USPTO did revealed any existing patent with an innovation capable of producing a bovine heparin with similar structural and functional activities as the porcine one, exposing the lack of knowledge on this field (Table 1).

anticoagulant activity to porcine mucosa heparin (market reference product), here referred as safe bovine heparin (SB Heparin).

The detailed analysis of intestinal mucosa bovine heparin fraction revealed a high 6-O-desulfated glucosamine content, which as related to a lower anticoagulant activity and higher protamine (antidote) neutralization concentrations are required.

The invention process comprises fractioning the intestinal mucosa derived bovine heparin with a polishing ion-exchange step. The ion-exchange step is conducted with sufficient salt elution concentration to render a bovine heparin with comparable structure and anticoagulant activity of porcine heparin.

As described herein bellow, these bovine heparin preparation contains low 6-O-desulfated glucosamine content when compared to traditional intestinal mucosa bovine heparin.

TABLE 1

| NUMBER | TITLE | OWNER | YEAR |
| --- | --- | --- | --- |
| CN107177014 | Process for hydrolyzing intestinal mucosa through protease | NANTONG YOULONG CASING FOOD CO LTD | 2017 |
| CN107141373 | Novel dalteparin sodium preparation process | HUBEI ENORAY BIOPHARMACEUTICAL CO LTD | 2017 |
| CN107056967 | Extraction method of heparin sodium | CHENGDU JIAYING LIVESTOCK PRODUCTION AND BIOCHEMICAL CO LTD | 2017 |
| WO2017032276 | BOVINE INTESTINAL MUCOSAENOXAPARIN SODIUM, PREPARATION METHOD THEREFOR, AND APPLICATION THEREOF | SUZHOU RONNSI PHARMA CO LTD | 2017 |
| CN106905448 | Process for improving yield of high-quality heparin sodium | NANTONG TIANLONG ANIMAL BY-PRODUCTS CO LTD | 2017 |
| CN106632732 | Heparin sodium purification method | QINGDAO JIULONG BIOPHARMACEUTICAL CO LTD | 2017 |
| US20160326547 | TRANSGENIC PRODUCTION OF HEPARIN | LFB USA INC | 2016 |
| CN105693886 | Preparation method of heparin sodium | CHANGZHOU LANXU CHEMICAL CO LTD | 2016 |
| CN105175578 | Extraction technology of heparin sodium | NANTONG RENSHOU FOODS CO LTD | 2015 |
| CN104672349 | Heparin sodium purification method | HUAIAN MAIDESEN PHARMACEUTICAL CO LTD | 2015 |
| CN104497172 | Purification method of low molecular heparin | QINGDAO KANGYUAN PHARMACEUTICAL CO LTD | 2015 |
| CN104448046 | Production process for extracting crude heparin sodium products from animal lungs | QINGDAO JIULONG BIOPHARMACEUTICAL CO LTD | 2015 |
| CN103951768 | Method for extraction of heparin sodium and co-production of polypeptide protein powder and amino acid protein powder by utilizing porcine and bovine lungs | GUIZHOU HUIJING BIOTECHNOLOGY CO LTD | 2014 |
| CN104231115 | New process for extracting heparin by degrading lung tissues | LIU CHULIANG | 2014 |

Shows the most relevant patents on the field after a search on both SPACENET and USPTO. It has been published different approaches to ameliorate heparin purification; however, none are able to convert bovine heparin preparation to porcine-like clinical qualities.

DISCLOSURE OF INVENTION

The invention provides the process for obtaining an unfractionated heparin preparation with low 6-O-desulfated glucosamine content from bovine intestine mucosa, rendering a heparin preparation with comparable structure and

BRIEF DESCRIPTION OF DRAWINGS

FIG. 1 shows unfractionated bovine heparin structure, comparison to porcine one.

FIG. 2A shows the anticoagulant activity in vitro of porcine and bovine heparin; FIG. 2B shows the anticoagulant activity in vivo of porcine and bovine heparin; FIG. 2C shows the protamine neutralization of porcine and bovine heparin.

FIG. 3A shows the venous antithrombotic activity using a stasis and hypercoagulability thrombosis model in vena cava of rats. Different doses of bovine or porcine heparin were administered and allowed to circulate for 5 min. Then, thromboplastin (5 mg kg-1 body weight) was slowly injected intravenously and 0.7 cm of the isolated vena cava segment was tied off. After 20 min stasis, the thrombus formed was dried and weighted. The results were expressed as % of thrombus weight, 100% representing absence of any inhibition of thrombosis (thrombus weight in the absence of heparin administration). FIG. 3B shows that the citrated blood samples collected from the carotid artery before and 5 min after intravascular administration of heparin. Then, the plasma was assayed for ex vivo aPTT. The results were expressed as ratios of clotting time after administration of different heparin doses (T1) and of the control, saline treated animals (T0). Values above 10 are not detected in the assay. FIG. 3C shows that different doses of heparin were infused into rats. After 5 min, the rat's tail was cut 3 mm from the tip and immersed in 40 ml of distilled water at room temperature. Blood loss was determined 60 min later by measurement of the haemoglobin in the water. The results were expressed as μl of blood loss. The insets in panels A and C express the dose-versus-response curves based on anticoagulant activity (IU kg-1). For clarity, only one standard error (SE) bar is shown in the panels. All the results are expressed as mean SE, n=5, *$p<0.01$ and **$p<0.05$ for bovine vs. porcine heparin using the Mann-Whitney Rank Sum test. The arrows in the insets of panels A and C indicate the dose of heparin required to achieve total inhibition of thrombosis (100 IU kg-1 body weight).

FIG. 4 shows the heparin neutralization process by protamine. Heparin (0.1 IU ml-1) was incubated with increasing concentrations of protamine, and thereafter mixed with 10 nM antithrombin and 2 nM factor Xa in 40 μl of TS/PEG buffer. After 60 sec of incubation at 37° C., the remaining factor Xa activity was determined with a chromogenic substrate ($A_{405}$ nm min-1).

MODES OF CARRYING OUT THE INVENTION

The invention relates to a bovine mucosa derived unfractionated heparin preparation, which presents a structure and anticoagulant activity comparable to porcine mucosa heparin, its preparation method and use, which are prepared from commercially available heparin. By "safe bovine heparin" or "SB Heparin" is meant a preparation with a low 6-O-desulfated glucosamine content, which possess a porcine mucosa heparin-like structure and anticoagulant activity.

In the context of this invention, anticoagulant activity of heparin relates to the inhibition of Xa and IIa coagulation factors by anti-thrombin III (AT).

In one aspect, the invention relates to the method of preparing bovine heparin with similar clinical therapeutic action to the porcine heparin one, including anticoagulant activity and protamine neutralization.

Analysis of commercially available preparations of porcine and bovine heparin by $^1H$ and $^{13}C$ one-dimensional (1D) and two-dimensional (2D) spectra of nuclear magnetic resonance (NMR) revealed that while porcine heparin is mainly composed by trisulfated disaccharide units, the bovine heparin is composed by highly 2-sulfated iduronic acid residues, but lack 6-O-sulfation on the glucosamine units.

Detailed analysis of heparin with the different structure composition indicated that the presence of disaccharides lacking 6-O-sulfation on the glucosamine of bovine heparin is associated with lower anticoagulant activity, higher bleeding effects and lower rates of protamine neutralization.

More specifically, it was determined that when compared heparin, bovine one has lower anticoagulant activity in a whole human plasma experiment (aPTT) (FIG. 2A). aPTT was performed with human plasma, various heparin concentrations, coagulation inducing aPTT reagents (bovine phospholipid reagent) and $CaCl_2$, which was recorded on a coagulometer. The results were expressed as the ratio of clotting time in the presence (Ti) or absence (To) of heparin. The anticoagulant activity was estimated as IU mg-1 using a parallel standard curve based on the $5^{th}$ International Heparin Standard (229 IU mg-1), obtained from the National Institute for Biological Standards and Control (Potters Bar, UK). Solutions of bovine and porcine heparin were prepared on a weight basis and showed similar hexuronic acid contents when checked by the carbazole reaction.

Figure 1A:
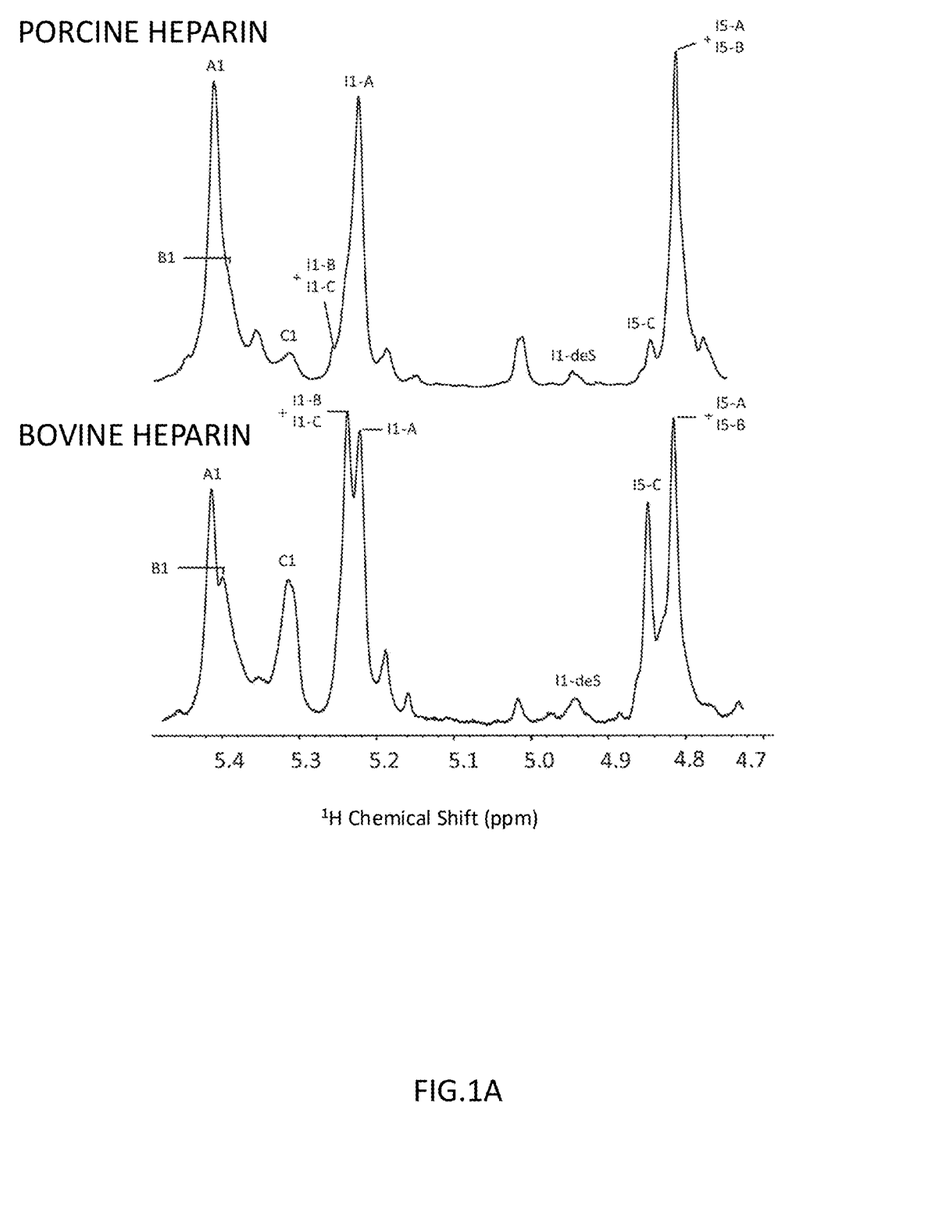
FIG. 1A shows porcine and bovine one-dimensional NMR spectra.
Figure 1B:
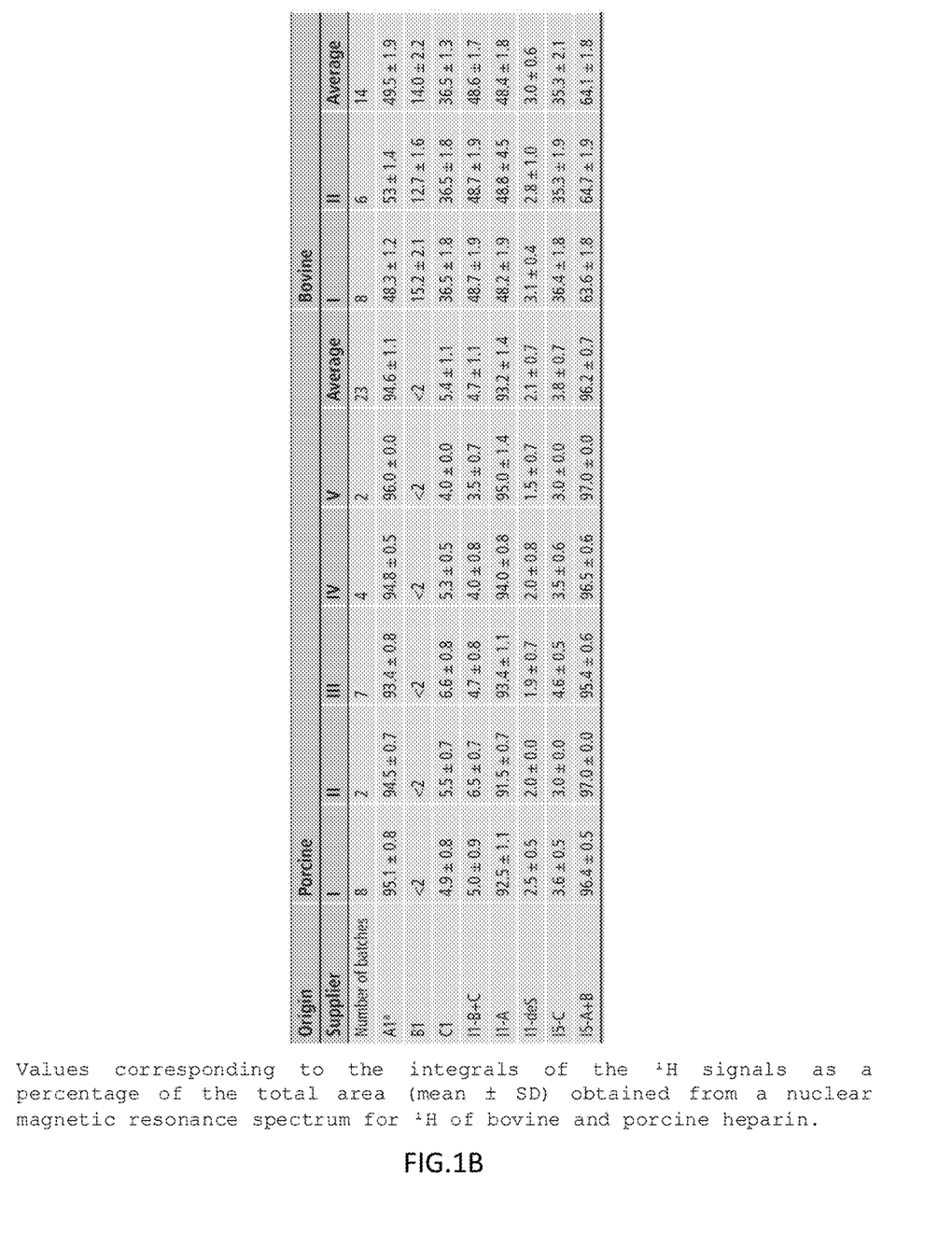
FIG. 1B shows percentage calculation of each one-dimensional peak from different commercial preparation of porcine and bovine heparin.
Figure 1C:
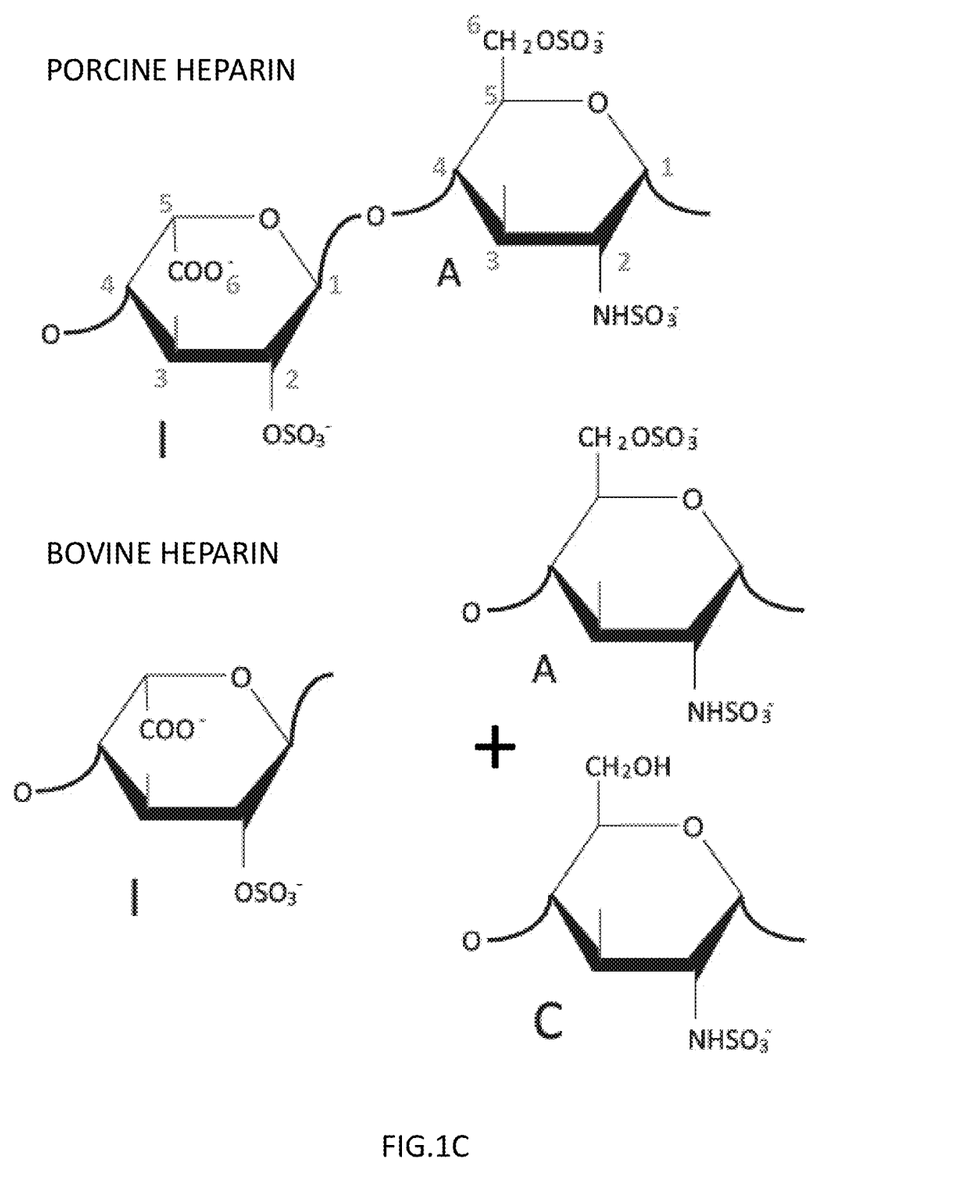
FIG. 1C shows the predicted structures of porcine and bovine heparin.
Figure 2:
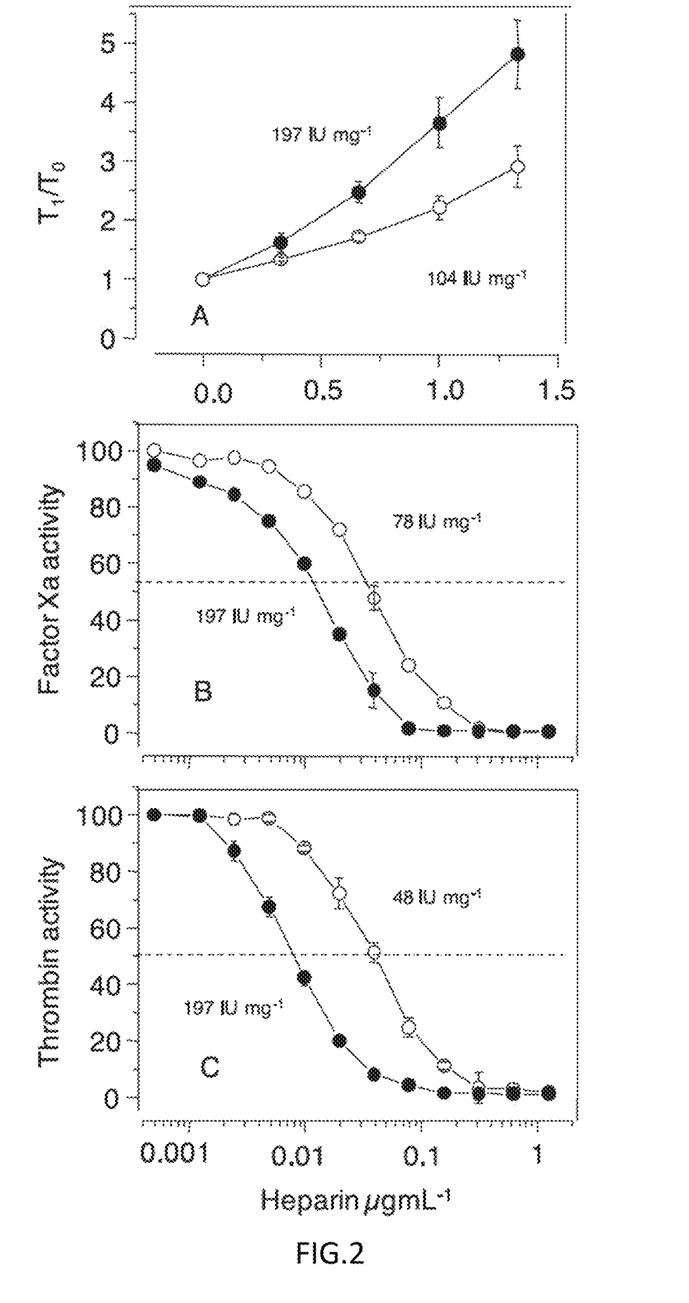
FIG. 2 shows unfractionated bovine heparin function (activity and protamine neutralization), comparison to porcine one.

In fact, the lower anticoagulant activity for bovine heparin in comparison with porcine one was confirmed using an assay with purified clotting factor (FIGS. 2B and 2C). Factors Xa and thrombin (anti-Xa and anti-IIa assay) were used in the presence a chromogenic substrate (S2238 for thrombin and S-2222 for factor Xa) and the absorbance was recoded at 405 nm for 300 seconds on a microplate reader. The rate of change of the absorbance was proportional to the thrombin or factor Xa activity remaining in the solution. Anti-IIa and anti-Xa activities were reported as unit mg-1, using a parallel standard curve based on the International Heparin Standard (229 unit mg-1).

Figure 3:
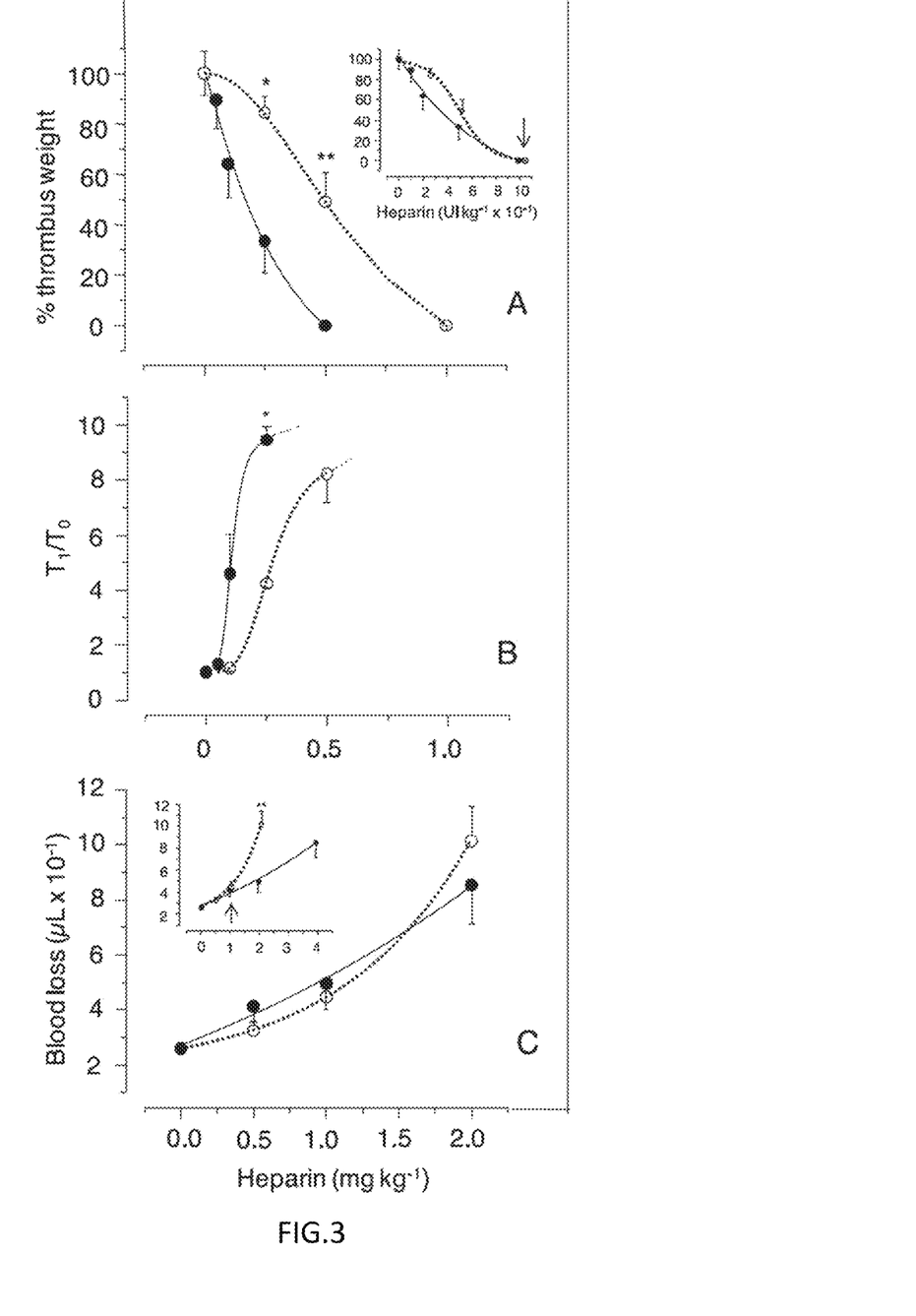
FIG. 3 shows the comparison between porcine and bovine derived heparins based on their activity and hemorrhagic tendencies.

In another aspect, the lower anticoagulant/antithrombotic activity for bovine heparin in comparison to porcine one was confirmed in vivo using rats with rabbit brain thromboplastin as thrombogenic stimulus (FIG. 3A). Following the institutional guidelines for animal care and experimentation rats (both sexes, ~200 g body weight, five animals per dose) were anesthetized and different doses of heparin were infused into the right carotid artery and allowed to circulate for 5 min. The inferior vena cava was isolated, and brain thromboplastin (5 mg kg-1 body weight) was slowly injected intravenously; after 1 min, 0.7 cm of isolated vena cava was clamped off using distal and proximal sutures. After 20 min stasis, the thrombus formed inside the occluded segment was carefully pulled out, washed with phosphate-buffered saline, dried for 1 h at 60° C. and weighted. Mean thrombus weight was obtained by the average weight from each group and then expressed as percentages of the weight, 100% representing absence of any inhibition of thrombosis formation (thrombus weight in the absence of heparin administration).

These results were confirmed by using citrated blood samples collected from the carotid artery before and 5 min after intravascular administration of heparin, which showed lower anticoagulant activity on bovine heparin injected rats plasma when compared to porcine one (FIG. 3B). The plasma was assayed for ex vivo aPTT. The results were expressed as ratios of clotting time after administration of different heparin doses (T1) and of the control, saline treated animals (T0).

Hemorrhagic tendencies are a central aspect during anticoagulant therapies, presenting as a central side effect with death risk during its clinical use. Analysis of bleeding tendencies after intravascular administration of bovine heparin in rats showed higher rates of blood loss when compared to the administration of bovine heparin (FIG. 3C). Is important to note that the analysis showed that both heparins have the same dose dependent induction of bleeding on a weight basis. However, curves based on anticoagulant activity (inset) clearly showed that bovine heparin is twice as potent in inducing bleeding as porcine heparin. Since on clinical use heparin is administrated based on its anticoagulant activity, bovine heparin has twice the hemorrhagic tendencies than porcine one, rendering a great health risk.

Figure 4:
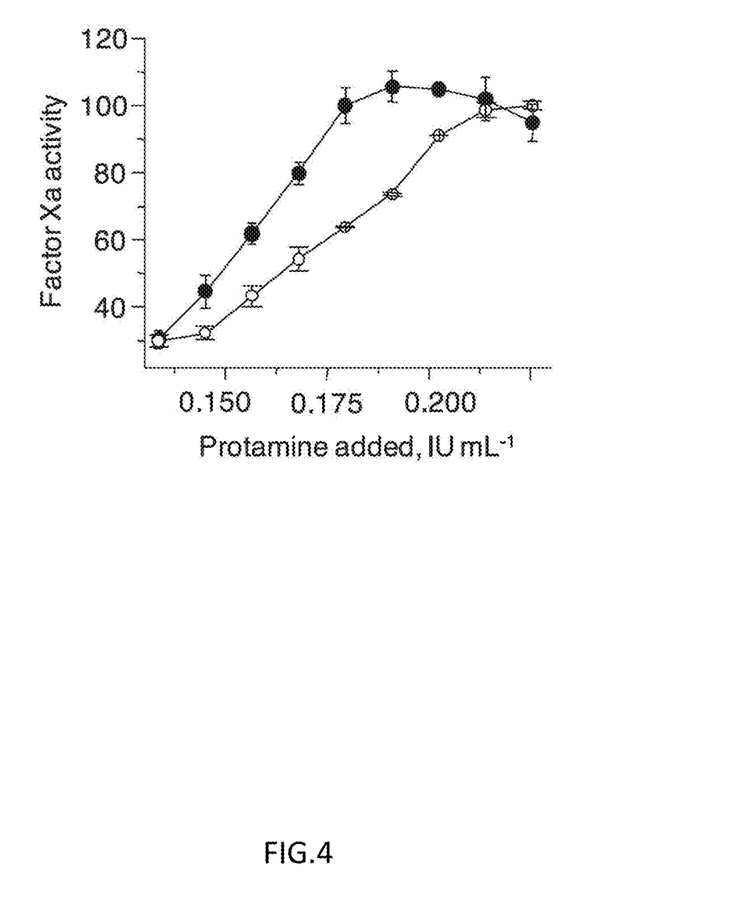

During the clinical use of heparin, neutralization of heparin at the end of extracorporeal circulation or when overdose of the drug is detected requires proper doses of protamine. Heparins with different chemical and biological properties, such as bovine and porcine heparins, may exhibit distinct protamine neutralization curves. Addition of protamine at similar doses to bovine or porcine heparin (on an IU basis), and heparin neutralization was assessed based on anti-Xa activity demonstrated that bovine significantly higher doses of protamine than porcine heparin to achieve neutralization (FIG. 4). This variation on protamine neutralization is a critical aspect of the marketed bovine heparin product, since is difficult to account for such variation during the clinical procedures, rendering potential risk to the patient's health.

These findings establish a new correlation between the origin, structure and function of heparin. More specifically, it determines that heparin fragments containing 6-O-desulfated glucosamine are associated with lower anticoagulant activity and protamine neutralization, and higher hemorrhagic effect.

Based on these findings, it was developed an innovative process to remove the heparin chains containing 6-O-desulfated glucosamine from purified bovine heparin from intestinal mucosa, rendering a purified bovine heparin with comparable structure and function that porcine heparin. Surprisingly, the test of distinct purification strategies revealed that the removal of 6-O-desulfated glucosamine containing heparin chains could be performed using an optimized chromatographic procedure with an ion-exchange chromatography. More specifically, the production of these new trisulfated-rich heparin from bovine mucosa was accomplished using a scalable purification procedure with a synthetic methacrylate based polymeric matrix with long linear polymer chains that carry the functional ligand of trimethylammonium ethyl.

This invention showed that the use of an ion-exchange chromatography polishing purification step is able to produce a safe bovine heparin (SB Heparin), which is a purified bovine heparin with low 6-O-desulfated glucosamine containing heparin polymers and high trisulfated disaccharide units with a structure and function comparable to the porcine heparin one. This considered a safe bovine heparin for the clinical due to its similarity to the market reference (porcine heparin), allowing an interexchange use on clinical medicine.

Figure 5:
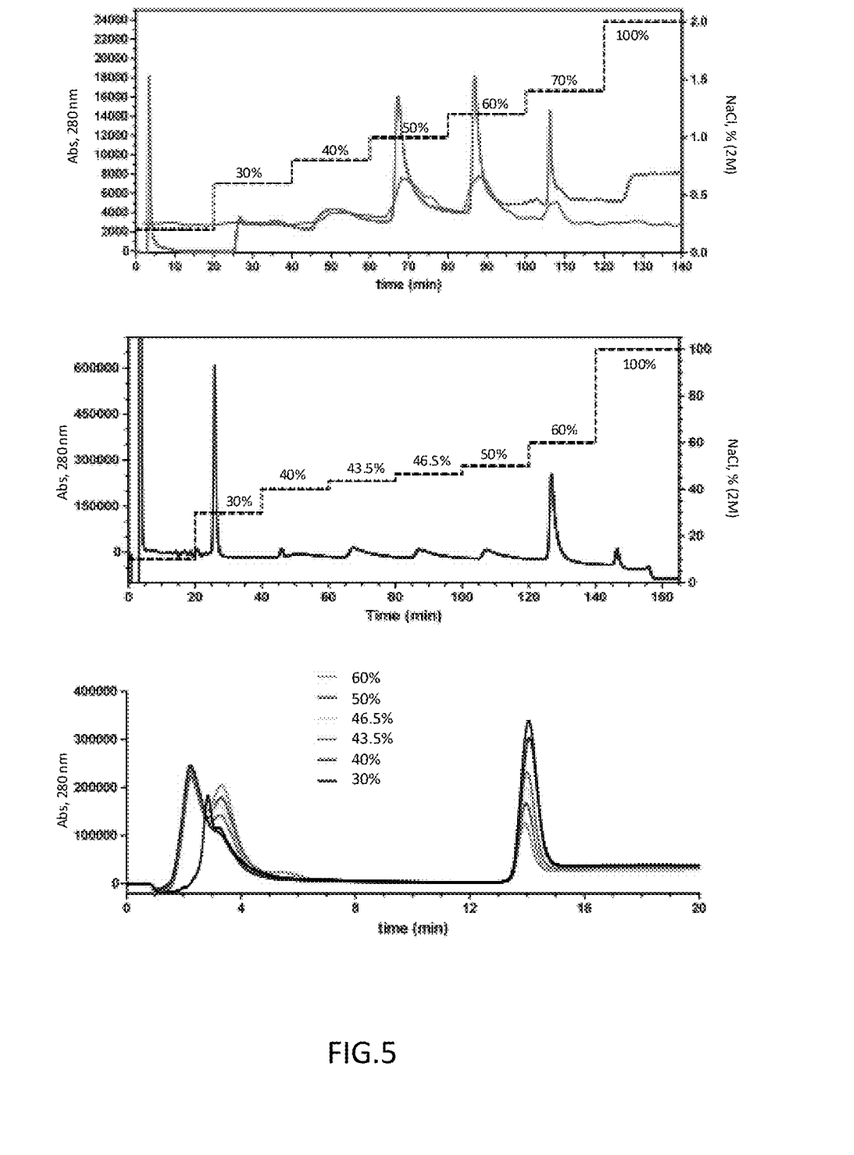
FIG. 5 shows the optimization of SB Heparin production on an ion-exchange chromatography 1 mL column coupled to a HPLC system.
Figure 6:
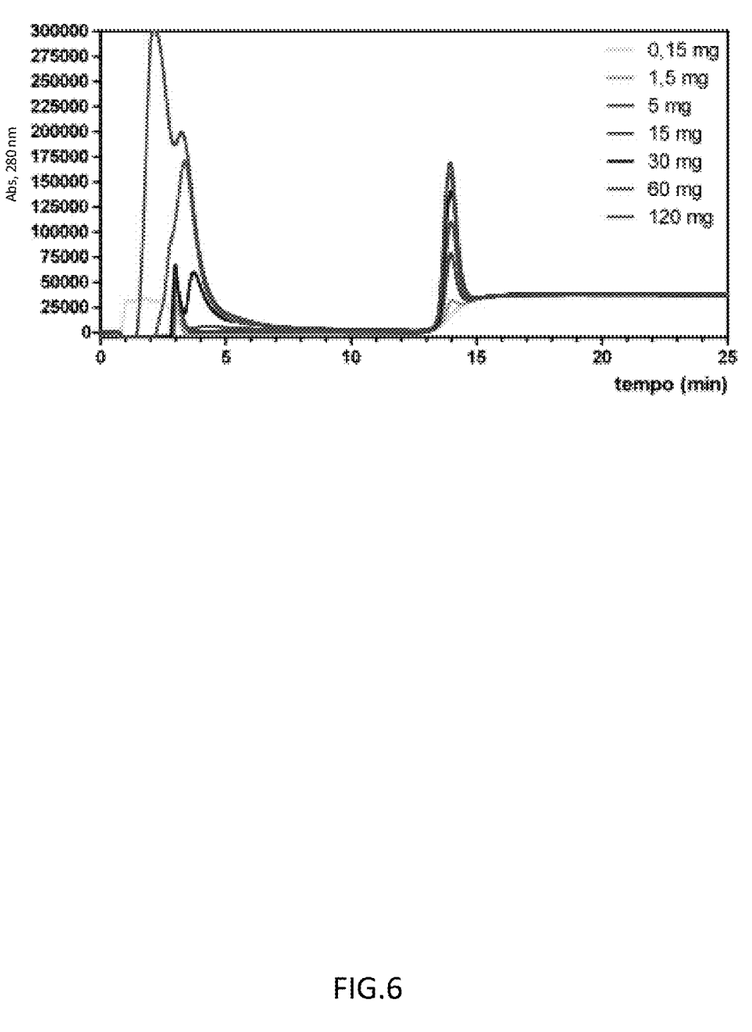
FIG. 6 shows the optimization of a scale up SB Heparin production on an ion-exchange chromatography 10 mL column coupled to a HPLC system.

For the removal of 6-O-desulfated glucosamine containing heparin polymers it was used an ion-exchange column TMAE HICAP from MERCK coupled to a HPLC system (optimization shown of FIGS. 5 and 6). As starting material it was used a commercially available intestinal mucosa bovine heparin with a specific activity of approximately 100 IU/mL. This heparin powder was diluted in running buffer (20 mM Tris with 0.02-0.1 M NaCl, pH 7.2) and applied to the TMAE column at a 3.5 ml/min flow rate. The elution of the bond heparin was performed with an initial washing step followed by two step-wise condition with salt concentrations ranging from 0.5 M to 2.0 M of NaCl. The first elution step rendered a low anticoagulant and high 6-O-desulfated glucosamine containing heparin, which was then discarded. The second peak was collected; the salt was removed by dialysis against distilled water and lyophilized. The structure and function of the purified bovine heparin was than analyzed in comparison to the porcine and the commercially available bovine heparin.

Figure 7:
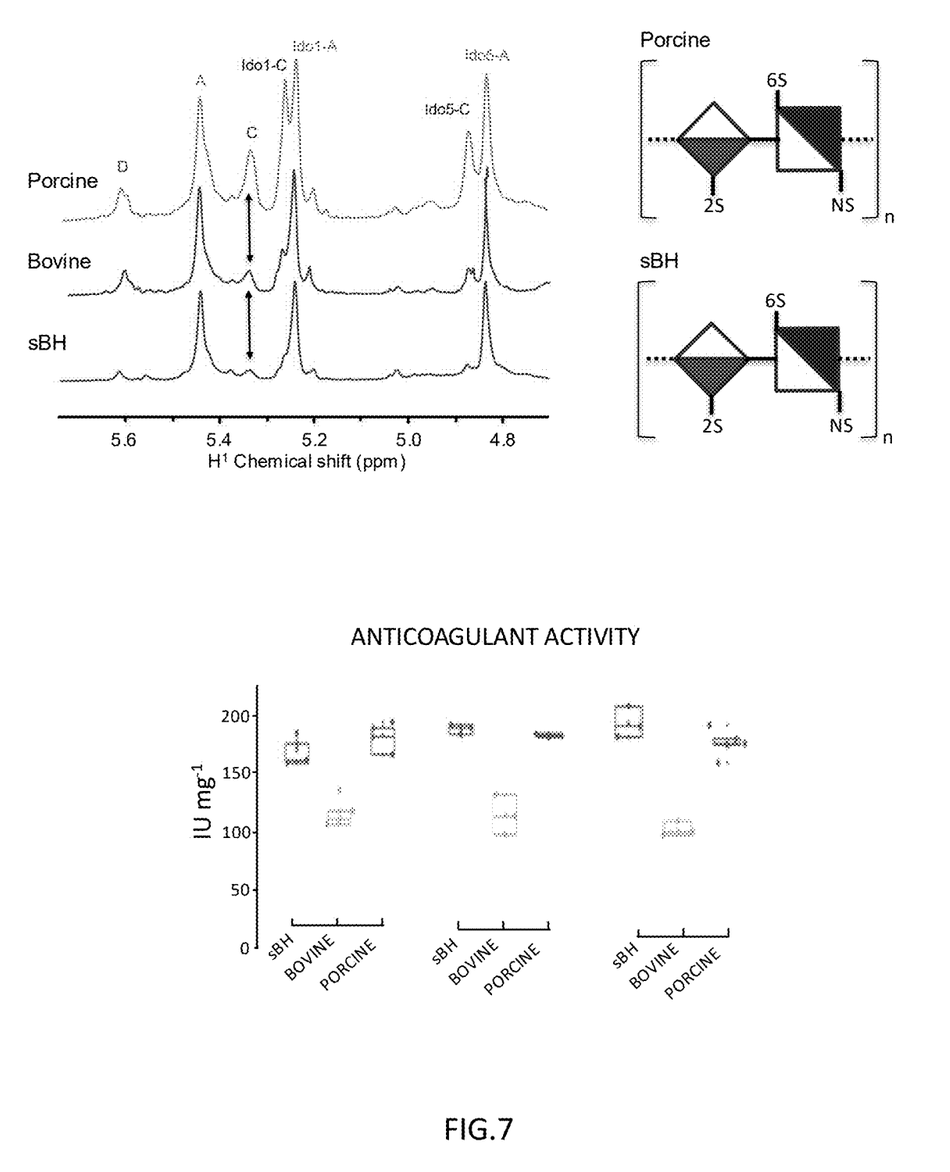
FIG. 7 shows the structure (one-dimension hydrogen nuclear magnetic resonance spectra) and function (whole plasma (aPTT) and purified clotting: factors (thrombin and Xa) assays.

The analysis of the purified bovine heparin revealed that this purification method renders a bovine heparin with similar structure and anticoagulant activity of porcine heparin. Structural analysis by nuclear magnetic resonance demonstrated that the 6-O-desulfated glucosamine containing heparin polymers were removed from the SB Heparin preparation method, as demonstrated by the lack of disulfated 6-O-desulfated glucosamine disaccharide residues represented by peak C (FIG. 7 A). Therefore, this innovative production process is efficient for the removal of the 6-O-desulfated glucosamine polymers from intestinal bovine heparin, producing a heparin preparation with similar structure to the porcine one.

More importantly, the purified bovine heparin showed an anticoagulant activity comparable to the porcine one (FIG. 7 B). The use of an in vitro anticoagulant assay with whole human plasma revealed that the purified bovine heparin has an anticoagulant activity slight lower than the porcine heparin. However, the anticoagulant assay with the purified clotting factors Xa and IIa showed that the purified bovine heparin has an anticoagulant activity slightly higher than the porcine one, but can be considered statistically similar. The assay with purified clotting factors is the assay accepted in the US pharmacopeia as official determinant of anticoagulant activity.

Therefore, this invention disclosures that with the use of a single polishing purification pre-scaled up step the production of intestinal bovine heparin renders a preparation with similar structure and function of porcine heparin, been considered a safe bovine heparin (SB Heparin) once it can be uses interchangeably in the clinical medicine.

In the aspect of this invention, a laboratory scale purification procedure with monobeads support linked to a quaternary amino ethyl functional ligand also produced a trisulfated-rich bovine heparin with porcine-like structure and function. These results indicate that after an optimization process other ion-exchange resins may be use for the production of low 6-O-desulfated glucosamine containing heparin. Further, in the aspect of this invention this purification step can be use at any step of the purification process.

EXAMPLES

The following example is intended to illustrate but not to limit the invention.

The starting material was a bovine heparin from intestinal mucosa (Extrasul S.A.) with a specific activity of approximately 100 IU/mL and a structure rich on 6-O-desulfated glucosamine. A quantity of 30 mg of bovine heparin was diluted in 3 mL of running buffer (20 mM Tris pH 7.2, with 100 mM NaCl).

A TMAE HICAP 1 mL column was equilibrated in a HPLC system with 10-column volumes of running buffer and the 3 mL of bovine heparin sample was applied at a flow rate of 3.5 ml/min. After washing with 5 column volumes of running buffer, the 6-O-desulfated glucosamine containing polymers were removed with a first 5-column volumes of a NaCl step (0.93 M NaCl) followed by a 5-column volumes wash. The trisulfated-rich heparin polymers were eluted with a second 5-column volumes 2 M NaCl step and collected. The collected sample was dialyzed against distilled water and lyophilized.

The purified sample was diluted in distilled water and the concentration was determined by uronic acid quantification by carbazol reaction. The sample was then submitted to a nuclear magnetic resonance structural analysis that revealed a porcine heparin-like structure that lacks 6-O-desulfated glucosamine peak as previous observed in the commercially available bovine heparin. The use of a purified clotting factor assay (Xa and thrombin) revealed an activity of approximately 190 mL IU/mL which is statistically similar to porcine's heparin activity of 180 IU/mL. There was an 85% recovery yield based on activity (IU units), which is determinant for heparin preparation production.

Here is shown a process for the improvement of bovine heparin production, rendering a safe bovine heparin (SB Heparin) which as comparable structure and function to porcine heparin (market reference) with an 85% yield. This innovation allows the inexpensive production of a high quality bovine heparin, which can be used interchangeably with porcine heparin in the clinical medicine. This is of crucial health system value for the general world's heparin production (preventing shortage risks) and for the Halal market.

REFERENCES

Aquino, R. S., Pereira, M. S., Vairo, B. C., Cinelli, T. P., Santos, G. R., Fonseca, R. J. and Mourão, P. A. (2010) 'Heparins from porcine and bovine intestinal mucosa: Are they similar drugs?', *Thromb Haemost*, 103(5), pp. 1005-15.

Bett, C., Grgac, K., Long, D., Karfunkle, M., Keire, D. A., Asher, D. M. and Gregori, L. (2017) 'A Heparin Purification Process Removes Spiked Transmissible Spongiform Encephalopathy Agent', *AAPS J*, 19(3), pp. 765-771.

Cifonelli, J. A. and Dorfman, A. (1962) 'The uronic acid of heparin', *Biochem Biophys Res Commun*, 7, pp. 41-5.

DAVIDSON, E. A. and MEYER, K. (1954) 'Chondroitin, a new mucopolysaccharide', *J Biol Chem*, 211(2), pp. 605-11.

Habuchi, H., Suzuki, S., Saito, T., Tamura, T., Harada, T., Yoshida, K. and Kimata, K. (1992) 'Structure of a heparan sulphate oligosaccharide that binds to basic fibroblast growth factor', *Biochem J*, 285 (Pt 3), pp. 305-13.

Howell, W. H. (1925) 'The purification of heparin and its presence in blood', *Am. J. Physiol.*, 17, pp. 9.

Howell, W. H. and Holt, E. (1918) 'Two new factors in blood coagulation—heparin and pro-antithrombin.', *Am. J. Physiol.*, 47, pp. 338-341.

Junqueira, D. R., Viana, T. C., Peixoto, E. R., Barros, F. C., Carvalho, M. and Perini, E. (2011) 'Heparin pharmacovigilance in Brazil', *Rev Assoc Med Bras* (1992), 57(3), pp. 322-6.

Lindahl, U., Backstrom, G., Thunberg, L. and Leder, I. G. (1980) 'Evidence for a 3-O-sulfated D-glucosamine residue in the antithrombin-binding sequence of heparin', *Proc Natl Acad Sci USA*, 77(11), pp. 6551-5.

Maccarana, M., Casu, B. and Lindahl, U. (1993) 'Minimal sequence in heparin/heparan sulfate required for binding of basic fibroblast growth factor', *J Biol Chem*, 268(32), pp. 23898-905.

Melo, E. I., Pereira, M. S., Cunha, R. S., Sá, M. P. and Mourão, P. A. (2008) 'Heparin quality control in the Brazilian market: implications in the cardiovascular surgery', *Rev Bras Cir Cardiovasc*, 23(2), pp. 169-74.

Santos, G. R. C., Tovar, A. M. F., Capillé, N. V. M., Pereira, M. S., Pomin, V. H. and Mourão, P. A. S. (2014) 'Structural and functional analyses of bovine and porcine intestinal heparins confirm they are different drugs', *Drug Discov Today*, 19(11), pp. 1801-1807.

Szajek, A. Y., Chess, F., Johansen, K., Gratzl, G., Gray, E., Keire, D., Linhardt, R. J., Liu, J., Morris, T., Mulloy, B., Nasr, M., Shriver, Z., Torralba, P., Viskov, C., Williams, R., Woodcock, J., Workman, W. and Al-Hakim, A. (2016) 'The US regulatory and pharmacopeia response to the global heparin contamination crisis', *Nat Biotechnol*, 34(6), pp. 625-30.

Tovar, A. M., Santos, G. R., Capillé, N. V., Piquet, A. A., Glauser, B. F., Pereira, M. S., Vilanova, E. and Mourão, P. A. (2016) 'Structural and haemostatic features of pharmaceutical heparins from different animal sources: challenges to define thresholds separating distinct drugs', *Sci Rep*, 6, pp. 35619.

Tovar, A. M., Teixeira, L. A., Rembold, S. M., Leite, M., Lugon, J. R. and Mourão, P. A. (2013) 'Bovine and porcine heparins: different drugs with similar effects on human haemodialysis', *BMC Res Notes*, 6, pp. 230.

Wardrop, D. and Keeling, D. (2008) 'The story of the discovery of heparin and warfarin', *Br J Haematol*, 141 (6), pp. 757-63.

The invention claimed is:

1. Safe bovine heparin (SB heparin) comprising a mixture of heparin molecules with less than 15% of disaccharides comprising 6-O-desulfated D-glucosamine [α1-4] 2-O-sulfated L-iduronic acid, wherein the SB heparin exhibits anticoagulant potency equal or superior to 180 heparin international units (IUs) per mg of heparin in assays of inactivation of active thrombin promoted by potentiation of antithrombin, and wherein the SB heparin is prepared by:
   (i) separating heterogeneous heparin molecules with different ionic charges, disaccharide compositions and anticoagulant activities present in unfractionated heparins obtained from bovine intestinal mucosa with ionic resins, through serial or progressive elution with aqueous solutions with different anionic strengths;
   (ii) obtaining the SB heparin fraction.

2. The SB heparin according to claim 1, for preparation of drugs for treatment of thromboembolic diseases, or for use in surgical and non-surgical hospital procedures that require extra corporeal circulation.

3. A pharmaceutical composition comprising the SB heparin according to claim 1, in the form of sodium and calcium salts, and a pharmaceutically acceptable vehicle, carrier or excipient.

4. The pharmaceutical composition according to claim 3, formulated to be administered topically or parenterally.

5. The pharmaceutical composition according to claim 4, formulated to be administered by intravenous or subcutaneous parenteral routes.

6. The SB heparin according to claim 1, wherein a synthetic methacrylate based polymeric matrix with long linear polymer chains that carry the functional ligand of trimethylammonium ethyl is used with serial elution protocols to enhance the ratio of heparin chains containing 6-O-sulfated glucosamine units.

* * * * *